United States Patent Office.

W. H. BURRIDGE, OF CLEVELAND, OHIO.

Letters Patent No. 61,606, dated January 29, 1867.

IMPROVEMENT IN CARBURETTING ILLUMINATING GAS.

*The Schedule referred to in these Letters Patent and making part of the same.*

TO ALL WHOM IT MAY CONCERN:

Be it known that I, W. H. BURRIDGE, of Cleveland, in the county of Cuyahoga, and State of Ohio, have invented certain new and useful Improvements in the Process of Carburetting Illuminating Gas for the purpose of increasing its illuminating properties; and I do hereby declare that the following is a full and complete description of the same, and of the ingredients used therein.

I take any of the light, volatile mineral oils, which are obtained by distillation or otherwise, with which either separately or singly, I combine or dissolve in the same any of the volatile hydrocarbon series, as balsam turpentine, camphor gum, or similar hydrocarbon organic compounds, which are rich in carbon. If campho gum is selected, the proportion should be about one and a half ounce to the gallon of oil, but more or les may be used. The other members of the series should range a little higher, in proportion to their richness i carbon.

In order to use this prepared oil, I place a suitable quantity, say about half a gallon, according to the siz of the apparatus, and which is so constructed as to expose a large surface of the oil to the action of the ga This apparatus is placed between the meter and the place of consumption of the gas. The gas is made to pas through this apparatus, and in so doing becomes highly charged with an auxiliary gas that is very rich i carbon; and by this it is made more highly illuminating.

What I claim as my improvement, and desire to secure by Letters Patent, is—

The combination of an auxiliary gas, from the organic volatile hydrocarbons, with the common illuminatin gas, as and for the purpose specified.

W. H. BURRIDGE.

Witnesses:
    J. H. BURRIDGE,
    E. E. WAITE.